(12) United States Patent
Vicenti

(10) Patent No.: US 10,296,007 B2
(45) Date of Patent: *May 21, 2019

(54) MOBILE ROBOT AREA CLEANING

(71) Applicant: iRobot Corporation, Bedford, MA (US)

(72) Inventor: Jasper Vicenti, Boston, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/698,005

(22) Filed: Sep. 7, 2017

(65) Prior Publication Data

US 2018/0088585 A1 Mar. 29, 2018

Related U.S. Application Data

(63) Continuation of application No. 14/511,947, filed on Oct. 10, 2014, now Pat. No. 9,798,328.

(51) Int. Cl.
*G05D 1/02* (2006.01)
*A47L 11/40* (2006.01)
*B25J 11/00* (2006.01)

(52) U.S. Cl.
CPC ........ *G05D 1/0242* (2013.01); *A47L 11/4061* (2013.01); *A47L 11/4066* (2013.01);
(Continued)

(58) Field of Classification Search
CPC .......... B25J 9/1694; G01B 11/24; A47L 5/30; A47L 11/4011; A47L 11/34; A47L 9/106;
(Continued)

(56) References Cited

U.S. PATENT DOCUMENTS 6,076,226 A 6/2000 Reed
6,389,329 B1 5/2002 Colens
(Continued)

FOREIGN PATENT DOCUMENTS

CN 1765595 5/2006
CN 101297267 10/2008
(Continued)

OTHER PUBLICATIONS

LG.com' [online], LG VR6270LVMB—HOM-BOT Vacuum Cleaners—LG Electronics—"Quietly but Thoroughly at Work LG HOMBOT Square," 2015, [retrieved on Apr. 24, 2015], retrieved from the Internet: URL <http://www.lg.com/ae/vacuum-cleaners/lg-VR6270LVMB>, 11 pages.
(Continued)

*Primary Examiner* — Rachid Bendidi
(74) *Attorney, Agent, or Firm* — Fish & Richardson P.C.

(57) ABSTRACT

A cleaning robot includes a chassis, a drive system connected to the chassis and configured to drive the robot, a signal generator and sensor carried by the chassis, and a controller in communication with the drive system and the sensor. The signal generator directs a signal toward the floor surface. The sensor is responsive to reflected signals from the floor surface. The controller controls the drive system to alter direction of the robot responsive to a reflected signal indicating an edge of the floor surface.

22 Claims, 11 Drawing Sheets

(52) U.S. Cl.
CPC ....... *B25J 11/0085* (2013.01); *A47L 2201/04* (2013.01); *G05D 2201/0203* (2013.01); *G05D 2201/0215* (2013.01)

(58) Field of Classification Search
CPC ....... A47L 9/2826; G01S 7/10; G01S 7/4802; A61L 2/10; G05D 1/0238
See application file for complete search history.

(56) References Cited

U.S. PATENT DOCUMENTS

| | | |
|---|---|---|
| 6,532,404 B2 | 3/2003 | Colens |
| 6,594,844 B2 | 7/2003 | Jones |
| 6,690,134 B1 | 2/2004 | Jones et al. |
| 6,781,338 B2 | 8/2004 | Jones et al. |
| 6,809,490 B2 | 10/2004 | Jones et al. |
| 6,965,209 B2 | 11/2005 | Jones et al. |
| 7,155,308 B2 | 12/2006 | Jones |
| 7,173,391 B2 | 2/2007 | Jones et al. |
| 7,196,487 B2 | 3/2007 | Jones et al. |
| 7,237,298 B2 | 7/2007 | Reindle et al. |
| 7,388,343 B2 | 6/2008 | Jones et al. |
| 7,389,156 B2 | 6/2008 | Ziegler et al. |
| 7,448,113 B2 | 11/2008 | Jones et al. |
| 7,571,511 B2 | 8/2009 | Jones et al. |
| 7,636,982 B2 | 12/2009 | Jones et al. |
| 7,761,954 B2 | 7/2010 | Ziegler et al. |
| 8,412,377 B2 | 4/2013 | Casey |
| 8,516,651 B2 | 8/2013 | Jones |
| 9,629,514 B2 | 4/2017 | Hillen et al. |
| 9,798,328 B2 | 10/2017 | Vicenti |
| 2002/0016649 A1 | 2/2002 | Jones |
| 2002/0120364 A1 | 8/2002 | Colens |
| 2003/0025472 A1 | 2/2003 | Jones et al. |
| 2004/0020000 A1 | 2/2004 | Jones |
| 2004/0049877 A1 | 3/2004 | Jones et al. |
| 2004/0187457 A1 | 9/2004 | Colens |
| 2004/0207355 A1 | 10/2004 | Jones et al. |
| 2004/0220698 A1 | 11/2004 | Taylor |
| 2005/0067994 A1 | 3/2005 | Jones et al. |
| 2005/0204717 A1 | 9/2005 | Colens |
| 2006/0216193 A1* | 9/2006 | Johnson .................... A61L 2/10 422/24 |
| 2006/0259212 A1 | 11/2006 | Jeon |
| 2007/0234492 A1 | 10/2007 | Svendsen |
| 2007/0266508 A1 | 11/2007 | Jones et al. |
| 2008/0140255 A1 | 6/2008 | Ziegler et al. |
| 2008/0155768 A1 | 7/2008 | Ziegler et al. |
| 2008/0307590 A1 | 12/2008 | Jones et al. |
| 2009/0157225 A1 | 6/2009 | Jung |
| 2010/0037418 A1 | 2/2010 | Hussey |
| 2010/0049365 A1 | 2/2010 | Jones et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2011/0040409 A1* | 2/2011 | Biber .................... A01B 69/008 700/259 |
| 2011/0154589 A1 | 6/2011 | Reindle |
| 2011/0202175 A1 | 8/2011 | Romanov |
| 2012/0119091 A1 | 5/2012 | Hong |
| 2012/0169497 A1* | 7/2012 | Schnittman ............. A47L 9/106 340/540 |
| 2012/0265343 A1 | 10/2012 | Gilbert, Jr. |
| 2013/0231819 A1* | 9/2013 | Hung .................... A47L 11/4011 701/23 |
| 2014/0088761 A1* | 3/2014 | Shamlian ............. G05D 1/0238 700/253 |
| 2014/0214205 A1 | 7/2014 | Kwon |
| 2014/0352103 A1 | 12/2014 | Won |

FOREIGN PATENT DOCUMENTS

| | | |
|---|---|---|
| CN | 1861330 | 11/2008 |
| CN | 102314176 | 1/2012 |
| CN | 103284665 | 9/2013 |
| CN | 103443612 | 12/2013 |
| CN | 203609373 | 5/2014 |
| CN | 103853154 | 6/2014 |
| CN | 104245244 | 12/2014 |
| KR | 10-1156282 | 6/2012 |
| WO | WO 1993/003399 | 2/1993 |
| WO | WO 2007/002708 | 1/2007 |
| WO | WO 2014/047557 | 3/2014 |

OTHER PUBLICATIONS

International Search Report and Written Opinion in International Application No. PCT/US2015/050718, dated Mar. 31, 2016, 12 pages.

International Preliminary Report on Patentability in International Application No. PCT/US2015/050718, dated Apr. 11, 2017, 8 pages.

Petitioner Request for Invalidation, in the Matter of "A Cleaning Robot", Chinese Patent No. 201520481446.0, filed Sep. 28, 2017 [English Translation].

* cited by examiner

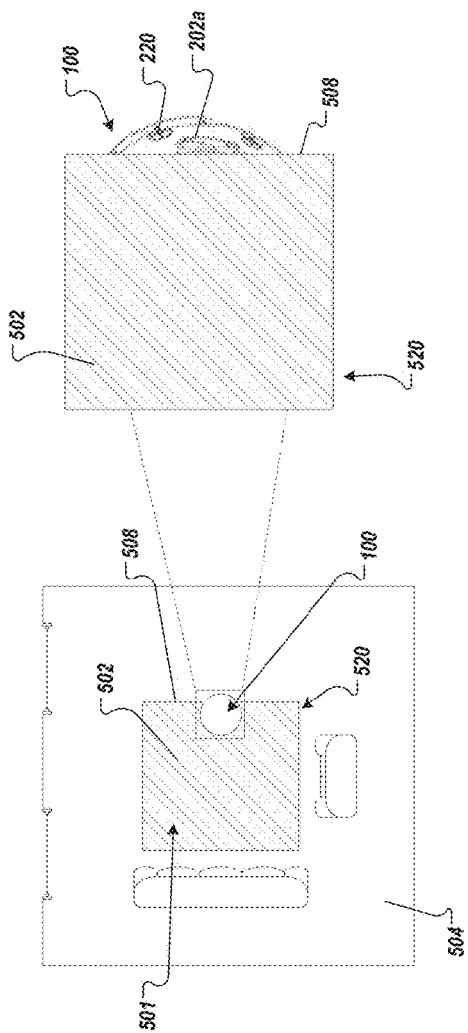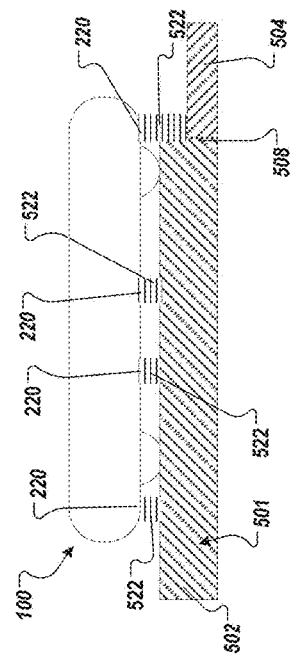
FIG. 5B
FIG. 5C

MOBILE ROBOT AREA CLEANING

CROSS-REFERENCE TO RELATED APPLICATIONS

This application is a continuation application of and claims priority to U.S. application Ser. No. 14/511,947, filed on Oct. 10, 2014, the entire contents of which are hereby incorporated by reference.

TECHNICAL FIELD

This disclosure relates to controlling mobile robots, particularly autonomous cleaning robots, to remain within an area and, in particular, techniques for designating the area for cleaning.

BACKGROUND

A robot is generally an electro-mechanical machine guided by a computer or electronic programming. Autonomous robots that perform household functions such as floor cleaning are now readily available consumer products. Mobile robots have the capability to move around in their environment and are not fixed to one physical location; however, a vacuuming robot working in one room may unintentionally wander from one room to another room or from one area to another area before satisfactorily completing the vacuuming.

SUMMARY

In general, this disclosure relates to a mobile robot and a method of confining the movement of the robot to a limited area, such as the surface of an area rug. The robot may include a plurality of sensors for use during a cleaning process, and one or more of these sensors can be advantageously configured to help confine the movement of the robot to a prescribed area, such as an area of a floor surface on which the robot initiates a cleaning process. In use, this confinement enables a user to clean a selected area based on the floor type of the area. For example, the concepts and methods described herein may be advantageously employed to keep a cleaning robot on an area rug for cleaning the area rug. A particular benefit may be realized in cleaning area rugs that are difficult for the robot to maneuver onto, due to the height of the area rug or because of rug slippage on an underlying hard floor surface.

In some aspects, a cleaning robot includes a chassis; a drive system connected to the chassis and configured to drive the robot across a floor surface; a signal generator carried by the chassis and arranged to direct a signal toward the floor surface; a sensor carried by the chassis and responsive to a reflection of the directed signal from the floor surface; and a controller in communication with the drive system and the sensor, the controller configured to control the drive system to alter direction of the robot in response to the sensor receiving a reflected signal indicating an edge of the floor surface, so as to keep the robot from crossing the floor surface edge.

Implementations may include one or a combination of any two or more of the following features.

In some implementations, the controller is configured to redirect the robot in response to a reflected signal indicating an edge of an area rug on which the robot is moving, the reflected signal indicating a reflection from a floor adjacent the edge of the area rug.

In certain implementations, the cleaning robot further includes multiple associated pairs of signal generators and sensors disposed at different locations about a peripheral edge of the robot, and wherein the controller is configured to alter robot direction as a function of which sensor receives a reflected signal indicating a floor surface edge.

In some implementations, the sensor is responsive to a characteristic of the reflected signal indicating an elevation of the floor surface.

In certain implementations, the sensor is responsive to a characteristic of the reflected signal indicating a reflectivity of the floor surface.

In some implementations, the sensor is responsive to a characteristic of the reflected signal indicating floor surface roughness.

In certain implementations, the signal generator is configured to emit an infrared signal and wherein the sensor is responsive to a reflection of the infrared signal from the floor surface.

In some implementations, the controller is further configured to control the drive system to drive the robot across the edge of the floor surface in a predetermined set of circumstances.

In certain implementations, the controller is further configured to redirect the robot away from a cliff edge sensed by an absence of a reflected signal at the sensor.

In certain aspects, a method of maneuvering an autonomous robot across a floor within a bounded area having at least one open edge includes driving the robot across the floor while sensing a signal from the robot reflected by the floor and received at a sensor carried by the robot; while continuing to drive the robot, evaluating the reflected signal to determine whether a characteristic of the received reflected signal indicates that the robot is adjacent an open edge of the bounded area; and in response to determining from the reflected signal that the robot is adjacent an open edge of the bounded area, altering a direction of robot motion such that the robot is directed away from the open edge.

Implementations may include one or a combination of any two or more of the following features.

In certain implementations, evaluating the reflected signal comprises evaluating the reflected signal against a baseline signal characteristic to sense a change in floor surface roughness.

In some implementations, the bounded area is the area of a rug having a perimeter edge adjacent a surrounding floor surface, and wherein the robot motion direction is altered in response to the sensor receiving a reflected signal indicating reflection from a surface other than a surface of the rug.

In certain implementations, the bounded area is a carpeted area, wherein the open edge is adjacent an uncarpeted floor surface, and wherein the robot motion direction is altered in response to the sensor receiving a reflected signal indicating reflection from the uncarpeted floor surface.

In some implementations, evaluating the reflected signal includes comparing the reflected signal to a stored baseline signal.

In certain implementations, the stored baseline signal is an estimation of a probability density.

In some implementations, the sensor is one of multiple sensors disposed at different places about a periphery of the robot, and wherein the reflected signal data is evaluated separately for each of the multiple sensors.

In certain implementations, the robot motion is altered as a function of which of multiple reflected signals differs greatest from the stored baseline signal.

In some implementations, the robot motion is altered to navigate a corner of the bounded area in response to changes in reflected signal at sensors located on opposite sides of the robot.

In certain implementations, evaluating the reflected signal includes comparing the reflected signal to the stored baseline signal over a detection period.

In some implementations, the sensor is responsive to a characteristic of the reflected signal indicating an elevation of an exposed surface of the floor.

In certain implementations, the sensor is responsive to a characteristic of the reflected signal indicating a reflectivity of a surface of the floor.

In some implementations, the robot includes a signal emitter configured to direct a signal toward the floor for reflection from the floor to the sensor.

In certain implementations, the signal emitter is configured to emit an infrared signal, and wherein the sensor is responsive to a reflection of the infrared signal from the floor.

In some implementations, the method further includes, in response to sensing a loss of reflected signal above a predetermined signal threshold value at the sensor, redirecting the robot away from a side of the floor location corresponding to sensor location at the loss of reflected signal.

In some implementations, the method further includes, upon determining from the reflected signal that the robot is adjacent an open edge of the bounded area following a triggering event, driving the robot across the open edge.

In certain implementations, the triggering event is completion of a predetermined cleaning period.

In some implementations, the triggering event is a determination that the bounded area has been sufficiently cleaned by the robot.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In the case of conflict, the present specification, including definitions, will control. In addition, the materials, methods, and examples are illustrative only and not intended to be limiting.

Other features and advantages of the invention will be apparent from the following detailed description and from the following claims.

DESCRIPTION OF DRAWINGS

FIG. 5B illustrates the robot at a boundary between two floor surfaces,

FIG. 5C is schematic side view of a robot at a boundary between two different floor surfaces.

Like reference symbols in the various drawings indicate like elements.

DETAILED DESCRIPTION

Cleaning robots such as autonomous vacuuming robots often operate in environments that include multiple floor surface types and clean areas of the multiple, different floor types during a single cleaning cycle. However, a user may desire to have a selected area such as a rug cleaned without cleaning the remainder of the room/environment. In order to allow selected areas to be cleaned, as described herein, the cleaning robot implements an area cleaning routine to clean a selected area of unknown geometry without the use of external confinement barriers. More particularly, the robot collects and analyzes data indicative of a floor surface material while cleaning the area and predicts whether the robot is likely to exit the area based on a change in floor surface. Based on a detected flooring change (e.g., a change from a carpet to hardwood), the robot proactively alters a travel direction to remain within the selected area.

Figure 1:
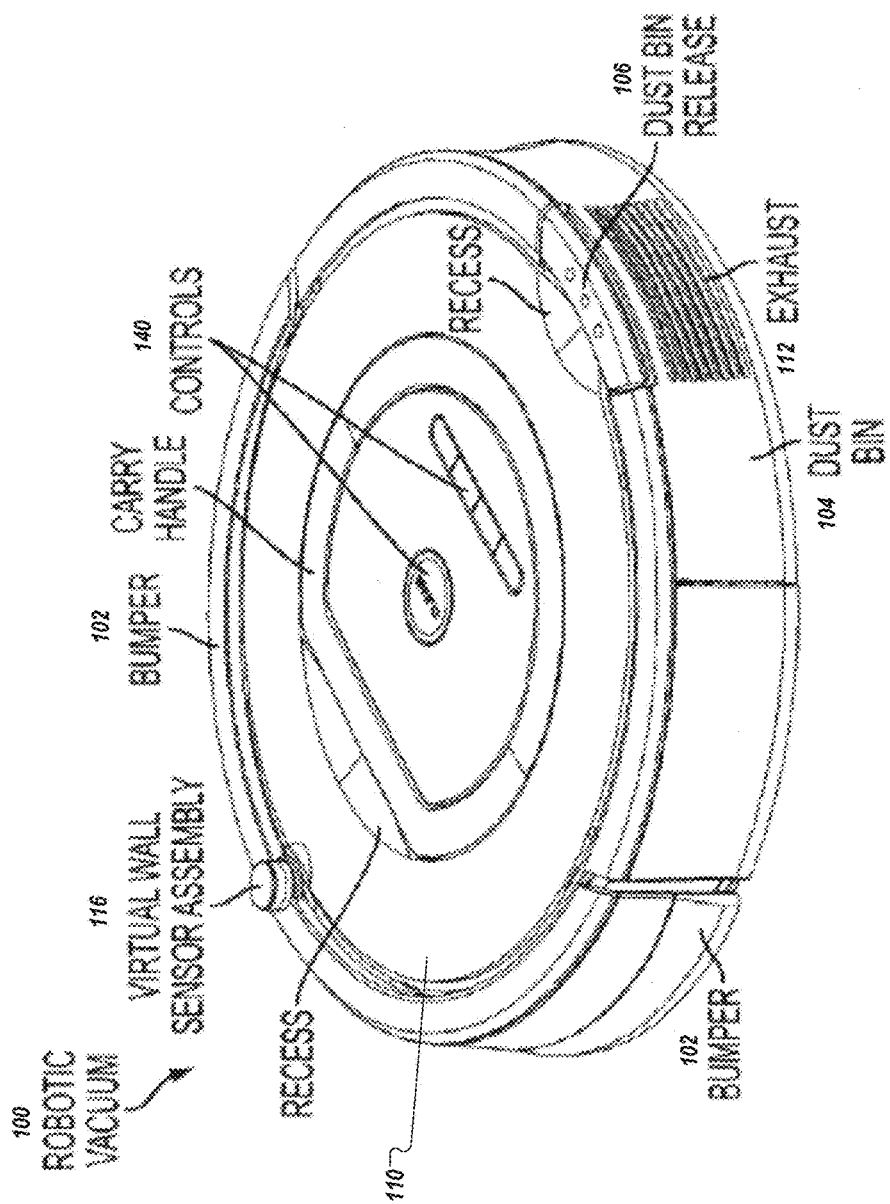
FIG. 1 is a perspective view of an exemplary robot.

Referring to FIG. 1, a robot 100 is configured to clean floor surfaces, including carpeted and uncarpeted floors. The robot 100 has a generally circular shape and includes a chassis 110 supporting mechanical and electrical components. However, the robot could have another shape such as having a square or rectangular front portion with a curved rear portion. A virtual wall omnidirectional detector 116 and a user interface 140 may be disposed on a top portion of the chassis 110. In some examples, the user interface 140 receives one or more user commands and/or displays a status of the robot 100. The chassis 110 may also include a dust bin 104 that can be removed from the chassis 110 by a release mechanism 106 that can be, for example, spring-loaded. The chassis 110 may also include an exhaust area 112 including vents that allow air to be expelled from the robot 100. A bumper 102 may be disposed on the side of the chassis for use in detecting an obstacle. While not shown, the chassis 110 may also support a power source (e.g., a battery) for powering any electrical components of the robot 100.

Figure 2:
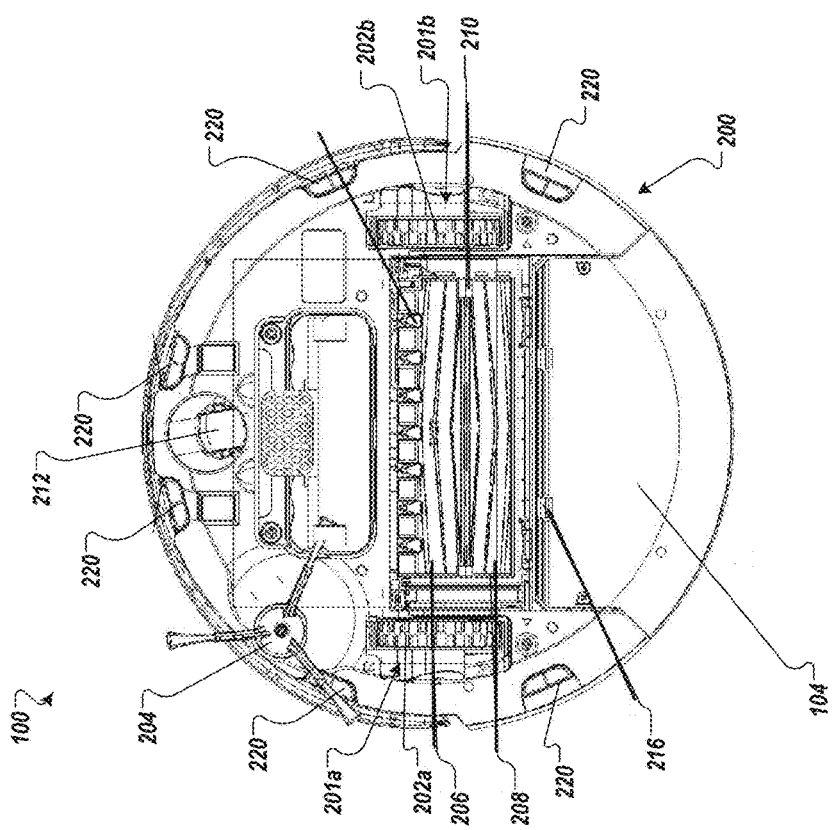
FIG. 2 is a perspective view of the robot shown in FIG. 1.

Referring to FIG. 2, the robot 100 may include a driven roller brush assembly 210 (e.g., with bristles and/or beater flaps) that extends parallel to the transverse axis of the robot 100 and rotatably attaches to the robot 100. The driven roller brush assembly 210 includes a rear roller brush 206 and front roller brush 208 that are disposed in a bottom surface 200 of the robot 100 for contacting a surface below the robot 100 with their respective rotations. For example, during use, the driven roller brush assembly 210 agitates debris off of a floor surface and throws or guides the agitated debris into the dust bin 104. The driven roller brush assembly 210 may also be removable from the robot 100 for maintenance, e.g., for cleaning. In some examples, the driven roller brush assembly 210 may be released from the robot 100 using one or more tabs 216. The robot 100 may also include a side brush 204 disposed in the bottom surface 200 for moving debris. For example, the side brush 204 may have an axis of rotation at an angle with respect to a surface below the robot 100 for moving debris into a cleaning swath area of the robot 100.

For maneuvering, the robot 100 may include a right driven wheel module 201a and a left driven wheel module 201b. The wheel modules 201a, 201b may be substantially opposed along a transverse axis X defined by the robot 100, and each include, respectively, a drive motor (not shown) and one of driving wheels 202a, 202b. The robot 100 may include a caster wheel 212 disposed to support a forward portion of the robot 100.

In some cases, the robot 100 includes one or more surface sensors 220 mounted on the bottom surface 200 of the robot 100. For example, the surface sensors 220 may be mounted in combination with the bumper 102. Additionally or alternatively, one or more surface sensors 220 may be located on the bottom surface of the robot 100 near a rear portion of the robot 100 or a side portion of the robot 100. As discussed further below, surface sensors 220 are configured to be responsive to cliffs, e.g., drop-offs, as well as to floor surface type transitions in the surfaces surrounding the robot.

Figure 3:
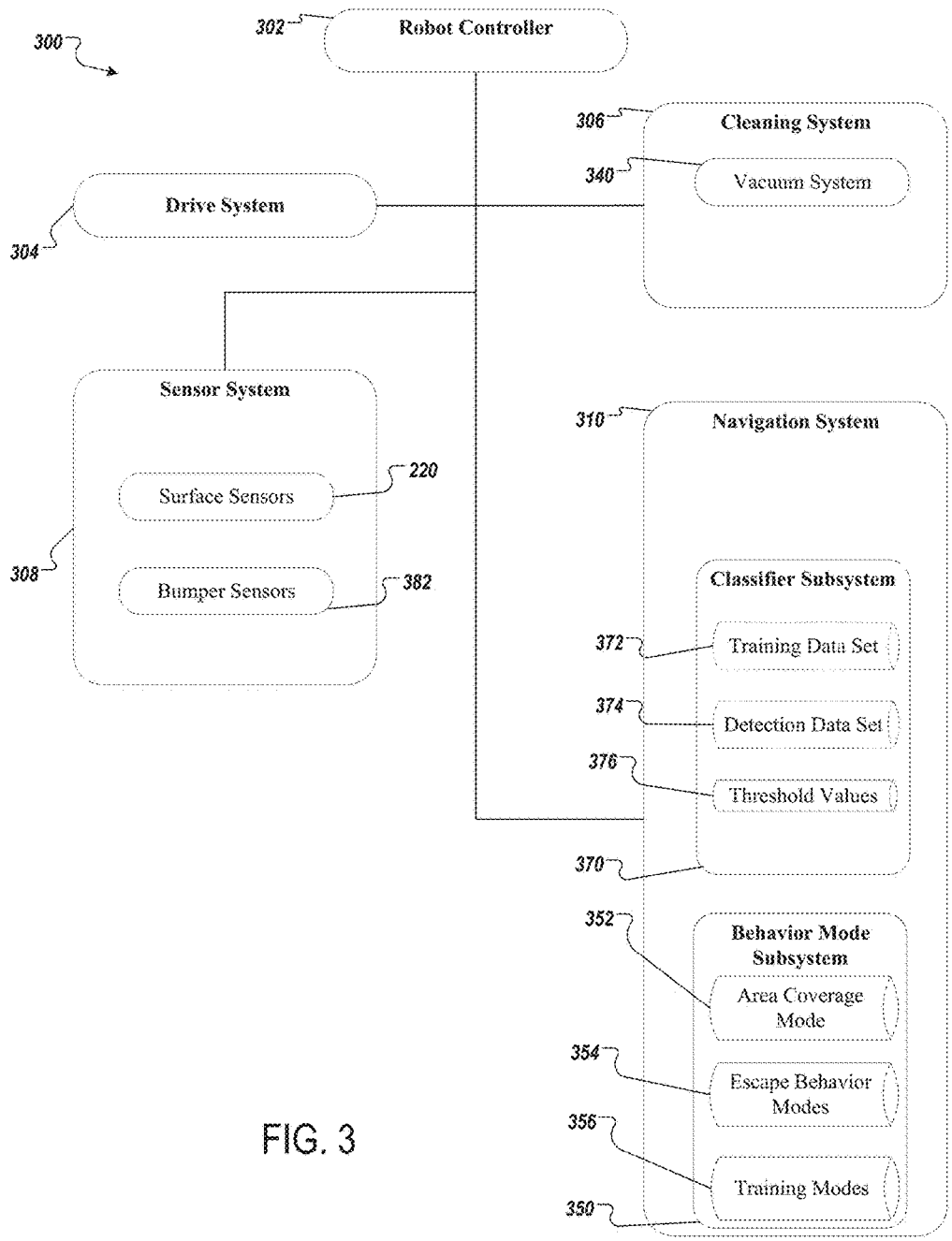
FIG. 3 is a schematic view of an exemplary controller for a mobile robot.
Figure 4:
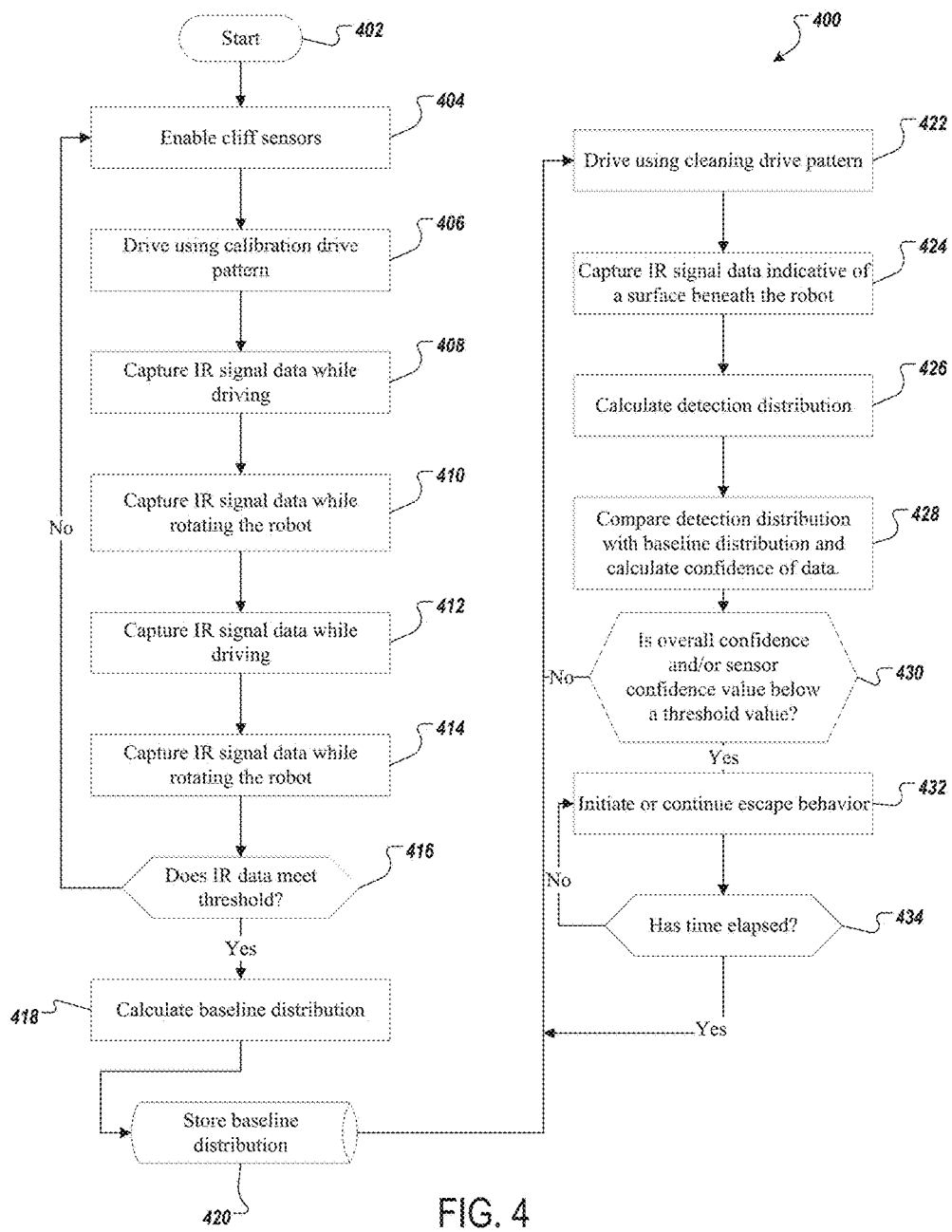
FIG. 4 is an exemplary arrangement of operations for an area confine process.

Referring to FIG. 3, in order to provide autonomous behavior, the robot 100 includes a controller 302 (e.g., a device having one or more computing processors in communication with memory capable of storing instructions executable on the computing processor(s)) that executes commands and controls a control system 300, which includes a drive system 304, a cleaning system 306, a sensor system 308, and a navigation system 310. In some examples, the user interface 140 is in communication with the controller 302 carried by the robot 100 such that one or more commands received by the user interface 140 can initiate execution of a cleaning routine to be performed by the robot 100.

The robot 100 may include a cleaning system 306 for cleaning or treating a floor surface (e.g., as shown in FIGS. 5A-5D). The cleaning system 306 may include a vacuum system 340 with a vacuum assembly defining a cleaning or vacuum pathway within the chassis 110 and in communication (as shown in FIG. 1) with the dust bin 104, the driven roller brush assembly 210, the rear roller brush 206, the front roller brush 208, and/or the side brush 204, such that debris agitated off of a floor surface travels along the vacuum pathway to the dustbin 104.

In various examples, the drive system 304 maneuvers the robot 100 across a floor surface based on a drive command having x, y, and θ components, for example, issued by the controller 302. The controller 302 generates control signals to operate independently the drive motors of the wheels 202a, 202b. In this example, the controller 302 can maneuver the robot 100 in any direction across a cleaning surface by independently controlling the rotational speed and direction of each wheel module 201a, 201b. In some cases, the controller 302 can maneuver the robot 100 to rotate substantially in place such that the robot 100 can change its direction of travel to maneuver away from an obstacle or away from a change in flooring surfaces.

Still referring to FIG. 3, the controller 302 can redirect the wheel modules 201a, 201b in response to signals received from the sensor system 308. For example, the wheel modules 201a, 201b redirect the robot 100 to avoid obstacles and clutter encountered while treating a cleaning surface. In another example, if the robot 100 becomes stuck or entangled during use, the controller 302 may direct the wheel modules 201a, 201b through a series of escape behaviors modes 354 so that the robot 100 can escape and resume normal cleaning operations. In another example, the wheel modules 201a, 201b can be redirected so that the robot 100 remains on a designated floor surface and avoids traveling away from the selected area. In this example, if the robot 100 encounters the perimeter of the designated area, the controller 302 may direct the wheel modules 201a, 201b through a series of escape modes so that the robot can turn away from the boundary and/or clean the surface adjacent to the perimeter before resuming a normal cleaning behavior.

To achieve reliable and robust autonomous movement, the sensor system 308 may include several different types of sensors which can be used in combination with one another to allow the robot 100 to make intelligent decisions about a particular environment. For example, controller 302 can be responsive to the sensor system 308, which includes one or more sensors disposed about the robot 100, to control the operations of the robot 100. These sensors can function as obstacle detection units, obstacle detection obstacle avoidance (ODOA) sensors, wheel drop sensors, obstacle-following sensors, a virtual wall omnidirectional detector 116, communication sensors, stall-sensor units, and main wheel encoder units, bumper sensors 382, and surface sensors 220. These sensors types may include, but are not limited to, range finding sensors, proximity sensors, contact sensors, a camera (e.g., volumetric point cloud imaging, three-dimensional (3D) imaging or depth map sensors, visible light camera and/or infrared camera), sonar, radar, LIDAR (Light Detection And Ranging, which can entail optical remote sensing that measures properties of scattered light to find range and/or other information of a distant target), LADAR (Laser Detection and Ranging), etc.

In some examples, each surface sensor 220 includes an IR emitter-detector pair configured and operative to establish a focal point such that an IR beam emitted downwardly by the emitter is reflected from the surface being traversed and detected by the detector. Communication between the emitter and the detector is affected by the vertical distance between the robot 100 and a floor surface. If the vertical distance is too great, no reflected radiation will be detected; however, smaller variations in the vertical distance may be caused by variations along a floor surface or between two or more floor surfaces. When reflected radiation is not detected by one of the surface sensors 220, the robot 100 determines that a drop-off is likely present at or near the affected sensor, which transmits a signal to the controller 302 (causing one or more behavioral modes to be implemented). Surface sensors 220 are additionally responsive to changes in the flooring surface type, or to much smaller changes in surface proximity, by sending a signal indicating a characteristic of reflected radiation received at the detector. The controller is configured to determine, by interpreting such signals, whether a change in flooring type, or a minor change in flooring elevation, is present at one or more of the surface sensors 220, such as by comparing the signal to a reference signal stored in relation to a floor on which the robot has been set to clean. One or more behavioral modes may be implemented in response to detecting such a flooring change.

The bumper sensors 382 may operate in combination with the bumper 102, as described above, to detect one or more obstacles in a drive path. For example, as the wheel modules 201a, 201b propel the robot 100 across a floor surface during a cleaning routine, the robot 100 may respond to events (e.g., obstacles, walls) detected by the bumper 102 by controlling the wheel modules 201a, 201b to maneuver the robot 100 in response to the event (e.g., away from an obstacle). While some sensors are described herein as being arranged on the bumper, these sensors can additionally or alternatively be arranged at any of various different positions on the robot 100.

Still referring to FIG. 3, the navigation system 310 includes two major functional subsystems: a classifier subsystem 370 and a behavior mode subsystem 350. The navigation system 310 performs the navigation functions of the robot 100. In some examples, the navigation system 310 is configured to determine a pose of the robot 100 within a known environment and determine a path for the robot 100 to travel.

While the navigation system 310 can maintain one or more maps of an environment that indicate the location of known obstacles, the environment in which the robot 100 operates can change without notice. To assist in navigating through potential obstacles, the navigation system 310 operates in combination with the controller 302 to execute one or more behavior modes. To assist in identifying potential obstacles and/or potential flooring changes, the navigation system 310 operates in combination with the controller 302 to identify variations in floor surface materials along a path of the robot 100 while the robot 100 is traveling.

The classifier subsystem 370 monitors signals captured by the sensor system 308 and predicts a flooring change based on an interpretation of those signals. The classifier subsystem 370 can predict a flooring change by classifying a floor surface as "selected" or "not selected." A "selected" floor surface can be a prediction that the floor surface type near the robot 100 corresponds to a floor surface type of a selected area. A "not selected" floor surface can be a prediction that the floor surface type near the robot 100 corresponds to a floor surface type beyond a selected area. As the classifier subsystem 370 predicts the floor surface type, the classifier subsystem 370 can provide its predictions to the navigation system 310, which can make navigation decisions, e.g., continuing movement in the travel direction or altering the heading of the robot 100, based on the predictions.

In operation, the classifier subsystem 370 receives information from the sensor system 308 and stores this information on a memory device, e.g., a hard disk, flash memory, random-access memory, of the robot 100. The training data 372 includes training data captured during a training interval. The detection data 374 corresponds to data captured during a detection interval. The threshold values 376 include predetermined values for use by the classifier subsystem 370 in classifying a floor surface.

Still referring to FIG. 3, the controller 302 (executing the control system 300) may execute the behavior modes that cause the robot 100 to take an action, such as maneuvering the robot 100 in a manner designed to cover an area or in a new direction when an obstacle or flooring change is detected. The behavior modes may include an Area Coverage Modes 352, an Escape Behavior Modes 354, and a Training Modes 356.

The Area Coverage Modes 352, e.g., an appropriate movement pattern to cover an area, can be used by the robot 100 to clean any defined, contiguous working area that is identified by a common floor surface type (e.g., an area rug, a carpeted surface, a hardwood surface, or a tile surface.) In the area coverage mode 352, the robot identifies a boundary/edge between two or more floor surface types by classifying floor surfaces near the robot 100 as "selected" and "not selected." Upon detecting a flooring change, the controller 302 may select an alternative behavior mode, e.g., one of the Escape Behavior Modes, resuming the Area Coverage Mode once the robot 100 has turned away from the "non-selected" floor surface type. In some examples, the robot 100 resumes the Area Coverage Mode 352 upon no longer detecting a "non-selected" floor surface type. In other examples, the robot 100 resumes the Area Coverage Mode upon no longer detecting a "non-selected" floor surface type for a predetermined time period.

The Area Coverage Mode 352 may include one or more headings randomly selected across the acceptable range of headings, or based upon some statistical selection scheme, e.g., Gaussian distribution. In some cases, a new turn heading may be followed by forward movement to increase the cleaning efficiency of the robot 100. The robot 100 may also follow a Random-Bounce behavioral mode in which the controller 302 is programmed to change headings randomly or at predetermined times, without input from the sensor system while in the Area Coverage Mode 352.

In another example, the Area Coverage Mode 352 may include an edge behavior mode so that the robot 100 can cover the entire surface—including the edges—of a selected area. In this mode, the robot 100 may follow the edge of the area to be cleaned for a predetermined amount of time or distance before proceeding on a new heading. In this case, the robot 100 may travel with at least one sensor indicating a dissimilar floor material or surface elevation, while the remaining sensors identify the designated area. Because of the arrangement of the surface sensors 220 and the wheels relative to the robot body, one of the surface sensors 220 can hover over a floor surface different from the floor surface the robot 100 is supported on. In such a case, the surface sensor 220 positioned over the adjacent floor surface will capture signal data differing from the signal data captured by the remaining surface sensors 220 that are disposed over the selected area. The signal data differences between surface sensors 220 is observable by comparing the data gathered by each of the surface sensors 220 against their respective baseline distributions, as discussed below, or against each other.

The robot 100 can be operated in the Area Coverage Mode 352 for a predetermined or random period of time, or for a predetermined or random distance (e.g., a maximum or minimum distance).

In certain examples, the Area Coverage Mode 352 includes a spot cleaning behavior mode in which the robot 100 drives in a spiraling pattern to a selected area. In other examples, the spot cleaning behavior mode includes moving sequentially along parallel paths, such as arranged in a corn row pattern. In some examples, the paths are not parallel and may overlap when the robot is turning 180° in a clockwise or counterclockwise direction. The pattern may additionally and/or alternatively include a back-and-forth movement similar to the way a person cleans with an upright vacuum.

Still referring to FIG. 3, upon an identification of a flooring change, the controller 302 may execute a movement in accordance with the Escape Behavior Modes 354. In some examples, the Escape Behavior Mode 354 features selecting a new heading by implementing a clockwise or counterclockwise turn to achieve the new heading. In these examples, the new heading may be based upon classification of the floor surface types surrounding the robot 100 and the locations of these floor surface types relative to the robot 100. The relative locations of these floor surface types can be determined from the signals received from surface sensors 220. For example, if the surface sensor 220 located on the right side of the robot 100 sends a signal indicating that it is receiving reflected radiation corresponding to a different floor surface, or a small change in floor surface elevation, the Escape Behavior Mode 354 may include a rotation such that a heading of the robot 100 is to the left of a previous travel heading. In another example, if the surface sensor 220 on the left side of the robot 100 identifies a change in a floor surface, the robot 100 may rotate right before proceeding. In other words, the controller may act to turn the robot away from a sensed floor surface edge.

In some examples, the robot is turned while traveling forward, so as to follow a curved floor surface edge, such as the edge of a circular or oval area rug.

While various Escape Behavior Modes 354 have generally been described with reference to avoiding a flooring change, the robot 100 can operate under one or more escape behavior modes 354 over the course of cleaning a selected area. For example, while cleaning an area rug or other selected area, the robot 100 may encounter an obstacle. If the robot encounters an obstacle and becomes stuck or is unable to continue in the same heading, the controller 302 may execute an Escape Behavior Mode 354, thereby causing the robot 100 to rotate and travel in a new direction.

The foregoing description of the behavioral mode subsystem 350 for the robot 100 are merely representative of the types of operating modes that can be implemented by the robot 100. One skilled in the art will appreciate that the behavioral modes described above can be implemented in other combinations and/or circumstances, and other behavioral modes and patterns of movement are also possible.

Still referring to FIG. 3, the Training Modes 356 can be used by the robot 100 for acquiring the training data 372. In the Training Modes 356, the controller 302 may execute a calibration movement pattern over a selected area/floor surface type while storing data captured by the sensor system 308 in the training data 372. In order to calibrate the robot 100 for a given floor surface, variances in a floor material of a selected area are obtained by maneuvering the robot 100 over the selected area. To account for data variances attributable to the movement of the robot 100, changes in ambient lighting, or patterns on the floor surface rather than to the floor surface type, the Training Mode 356 may include multiple phases. In some examples, during each phase, the robot 100 includes a forward movement, a rotational movement, and/or a combination of movements. These movements may be of varying path length, duration and/or direction.

In some examples, training data captured by the surface sensors 220 while the robot 100 is rotating replicates deviations in data collection inherent to a movement of the robot 100. For example, in some cases, the robot 100 naturally experiences a tilting, to at least some degree, while rotating. Similarly, the surface sensors 220 may receive variable amounts of light from the ambient environment, e.g., caused by changes in distance and/or angle between the robot and a fixed light source or by differences between two or more light sources. By traveling in a forward direction, the robot 100 may capture at least some training data 372 to account for these variations. In other examples, a material surface may have a pattern, e.g., a patterned area rug. The pattern may be a pattern of surface reflectance or a pattern of elevation, such as an embossed rug surface. By traveling over the patterned surface, the robot may capture at least some training data 372 to account for variations captured by the surface sensors 220 caused by this surface pattern.

In one example, the robot 100 sequentially drives forward, rotates counterclockwise 180°, drives forward again, and then rotates clockwise 180°. In this example, the robot 100 travels along a path and returns along the same path. Returning along the same path, e.g., over the same portion of a selected area, can compensate for variances caused by ambient lighting or lighting direction.

In some examples, the robot 100 travels forward along multiple paths, in different directions, over the course of the Training Mode 356. In some examples, the robot 100 travels forward in each direction a predetermined distance, such as about 0.3 to 2 meters.

The robot 100 may rotate multiple times over the course of the Training Mode 356, in a counter clockwise direction, clockwise direction, or a combination of directions. One or more of these rotations may feature rotating 180° such that the robot is aimed to return in an opposite direction.

Referring to FIGS. 4 and 5A-D, in an exemplary process for implementing an Area Cleaning Routine 400 for cleaning a selected area 501 without cleaning a surrounding hardwood floor surface 504, e.g., the remainder of the room/environment, the Area Cleaning Routine 400 confines the robot 100 to the selected area 501 based on a detected flooring change relative to an initial flooring type without the use of external confinement barriers. In this example, the robot 100 initially is within the selected area 501, e.g., on a carpeted surface 502. The selected area 501 has a perimeter or boundary 508 defined by a flooring change from the carpeted surface 502 of the selected area 501 to a surrounding floor type having a hardwood floor surface 504. During the Area Cleaning Routine 400, the robot 100 is navigated so as to remain on the carpeted surface 502 without moving onto, or cleaning, the surrounding hardwood floor surface 504.

To initiate the Area Cleaning Routine 400, a user first selects the area cleaning mode feature (402), e.g., through the user interface. If previously offline, the surface sensors 220 are enabled (404). To classify a floor surface of the selected area 501, the controller 302 executes the Training Modes such that the robot 100 moves in accordance with a calibration movement pattern (406) over at least a portion of the selected area 501. For example, during a first phase the robot 100 may drive in a forward direction for a set time period and/or distance while the surface sensors 220 capture signal data (408) indicative of one or more characteristics of a floor surface of the selected area 501. As discussed, the surface sensor signals may include signal strength values representative of IR light reflected from the floor surface (408). As the surface sensors 220 capture the signals, the signals are stored and/or provided to the classifier subsystem. This provides the control system with the first set of the training data.

Upon completing the first phase, the robot 100 rotates while the surface sensors 220 continue to capture signal data (410). After rotating, a third phase may include the robot 100 driving in a forward direction for a set time period and/or distance while the surface sensors 220 capture signal data (412). In the fourth phase, the robot 100 may complete a second rotation (414) while recording data from the surface sensors 220.

Figure 5A:
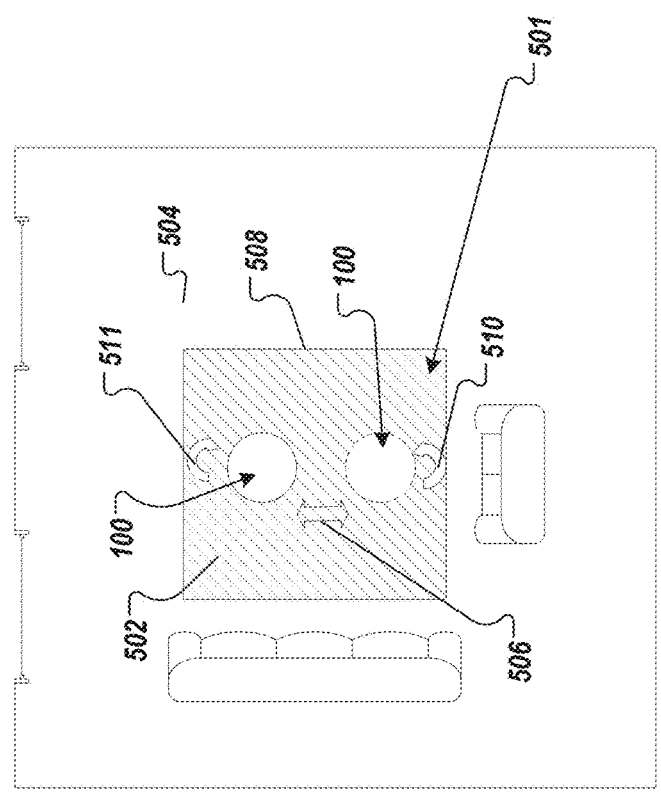
FIG. 5A illustrates a training routine within a representative environment.

Referring to FIG. 5A, to designate the area 501 as the selected area to be cleaned, surface 502 must be classified in a Training Mode. The robot 100 drives forward along a direction 506 from an initial starting position (as shown by solid lines) to a second position (as shown by broken lines). In this example, the robot may traverse up to a meter or more of the rug. The robot then rotates 180° in a counterclockwise direction 510 and returns to the initial position on the surface 502. The robot then rotates 180° again in a counterclockwise direction 511, such that the robot is in the same position, and pointed in the same direction, as when it started. The rotational directions are interchangeable, and in other examples, the robot 100 rotates more or less than 180° such that the robot 100 travels to the third position rather than back to the initial position.

Referring to FIGS. 4 and 5A-D, upon completion of the Training Modes, the classifier subsystem analyzes the training data to determine if sufficient data was acquired (416). If the training data is insufficient to classify a selected floor surface, the robot 100 remains in the Training Modes and the calibration movement pattern is repeated. If the training data is sufficient, the classifier subsystem analyzes the training data and classifies the selected floor surface. The classifier subsystem determines a data distribution to serve as a baseline distribution (418). This baseline distribution is then stored for later reference (420). This baseline distribution may represent, for example, the frequency distribution of the training data, such as of the strength of the signals from the surface sensors 220 during a training interval. For example, the surface sensors 220 may detect reflected IR radiation, such as light from a respective emitter on the robot, reflected from a surface immediately below or adjacent the surface sensor, and using standard signal processing techniques, the reflected IR radiation, as an optical signal, may be converted into electrical signals having a signal strength value, e.g., a value representing an intensity of the reflected IR radiation. Thus, the baseline distribution may indicate the number of occurrences of a given signal strength value over the training interval.

In some examples, the sufficiency of the data is determined by comparing a threshold value (pre-computed or dynamically determined) with the number of samples acquired during the Training Modes. The threshold is, for example, based at least in part on the capture rate of the surface sensors and the distance the robot travels during training. For example, if the Training Mode includes the robot first traveling forward for 0.25 m, then rotating 180° clockwise, then driving forward for 0.125 m, and then rotating 180° counter-clockwise, the threshold value can be 256 training samples with 25% of the samples acquired by first driving forward, 25% of the samples acquired while rotating clockwise, 25% of the samples acquired while rotating counter-clockwise, and 25% of the samples acquired while driving forward again. In this example, the threshold value can be a minimum of 256 samples with at least 25% of the minimum sample size, e.g., 64 samples, associated with each movement. These parameters can be adjusted to account sensor variations, surface variations, or other factors.

Figure 6:
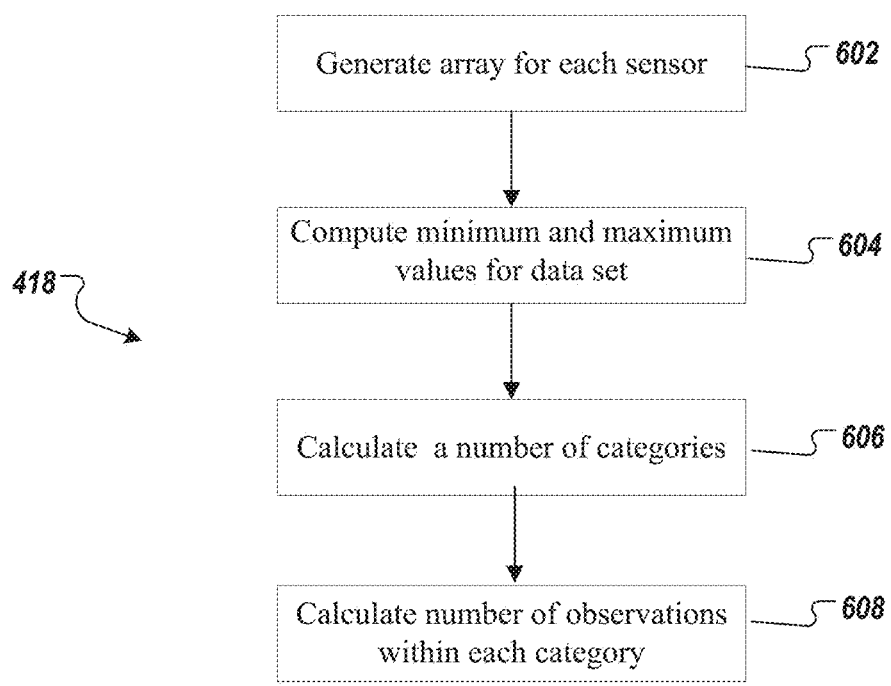
FIG. 6 is an exemplary arrangement of operations for exemplary baseline distribution determination process.

Referring to FIG. 6, an exemplary process for calculating the baseline distribution 418 is shown. In some examples, the baseline distribution can be used to estimate the probability distribution of the data, which can be useful in predicting a change in flooring. To calculate the baseline distribution, a variety of statistical techniques may be used (e.g., by histogram, kernel density estimators, nearest neighbor method, variable kernel method, orthogonal series estimators, maximum penalized likelihood estimators, general weight function estimators, bounded domains and directional data, comparing the mean and standard deviation of the sensor signal, applying the earth mover's distance (i.e. Wasserstein metric) approach to comparing two probability distributions, or any combination thereof.) In some examples, the data is analyzed with a numerical or graphical, e.g., histogram, distribution of the respective frequencies of signal strength values to estimate the probability density function. In these examples, the classifier subsystem executes the process for calculating the baseline distribution 418 by first separating the training data into individual arrays corresponding to the surface sensor that originated the training data (602). As discussed above, the collected data may include signal strength values representative of the reflected IR radiation received at the surface sensors. The classifier subsystem then categorizes each signal strength value (604), e.g., by assigning each signal strength value to a category or bin (604). In some cases, each category or bin corresponds to a fixed range of signal strength values within a data set, e.g., the training data or the detection data set. The classifier subsystem can then determine a frequency of each signal strength value based on the number of results in each bin (606). Optionally, the data may also adjusted using a noise-correction factor to account for noise in the recorded data In some examples, the baseline distribution may also be calculated mathematically as shown in Equation 1 and Equation 2, where function m, represents a number of observations that fall into each of the categories, n be the total number of observations and k is the total number of bins. In some cases, the number of categories or bins can be calculated using other known equations or the number of categories or bins can be the number of discrete values in the dataset between a computed maximum value and a computed minimum value (as discussed below).

$$n = \sum_{i=1}^{k} m_i. \qquad \text{Equation 1}$$

$$k = 1 + \log_2 n \qquad \text{Equation 2}$$

The categories, e.g., bin intervals, can be based on the minimum and maximum values observed in the data set. For example, the minimum and maximum values can be adjusted by a correction factor, e.g., a fixed bin-tolerance value, to account for noise in the data, e.g., noisiness of the sensor and the variability of the reflectivity due to changes in the distance of the robot to the floor, using Equation 3 and Equation 4, where $\max_{computed}$ is the adjusted maximum value; $\max_{observed}$ is the maximum value in the data set, tolerance is the correction factor; $\min_{computed}$ is the adjusted minimum value; and $\min_{observed}$ is the minimum value in the dataset. Then, the bin interval can be determined using the adjusted maximum value and the adjusted minimum value, as shown in Equation 5, where $interval_{computed}$ is the calculated bin interval based on the total number of bins k. If the calculated bin interval is less than a fixed minimum bin interval size, then the final bin-interval is set to the fixed minimum, as shown in Equation 6, where $interval_{final}$ is the final bin interval and $interval_{min}$ is the fixed minimum bin interval size.

$$\max_{computed} = \max_{observed} + \text{tolerance} \qquad \text{Equation 3}$$

$$\min_{computed} = \min_{observed} - \text{tolerance} \qquad \text{Equation 4}$$

$$interval_{computed} = \frac{\max_{computed} - \min_{computed}}{k} \qquad \text{Equation 5}$$

$$interval_{final} = \max(interval_{computed}, interval_{min}) \qquad \text{Equation 6}$$

Figure 7:
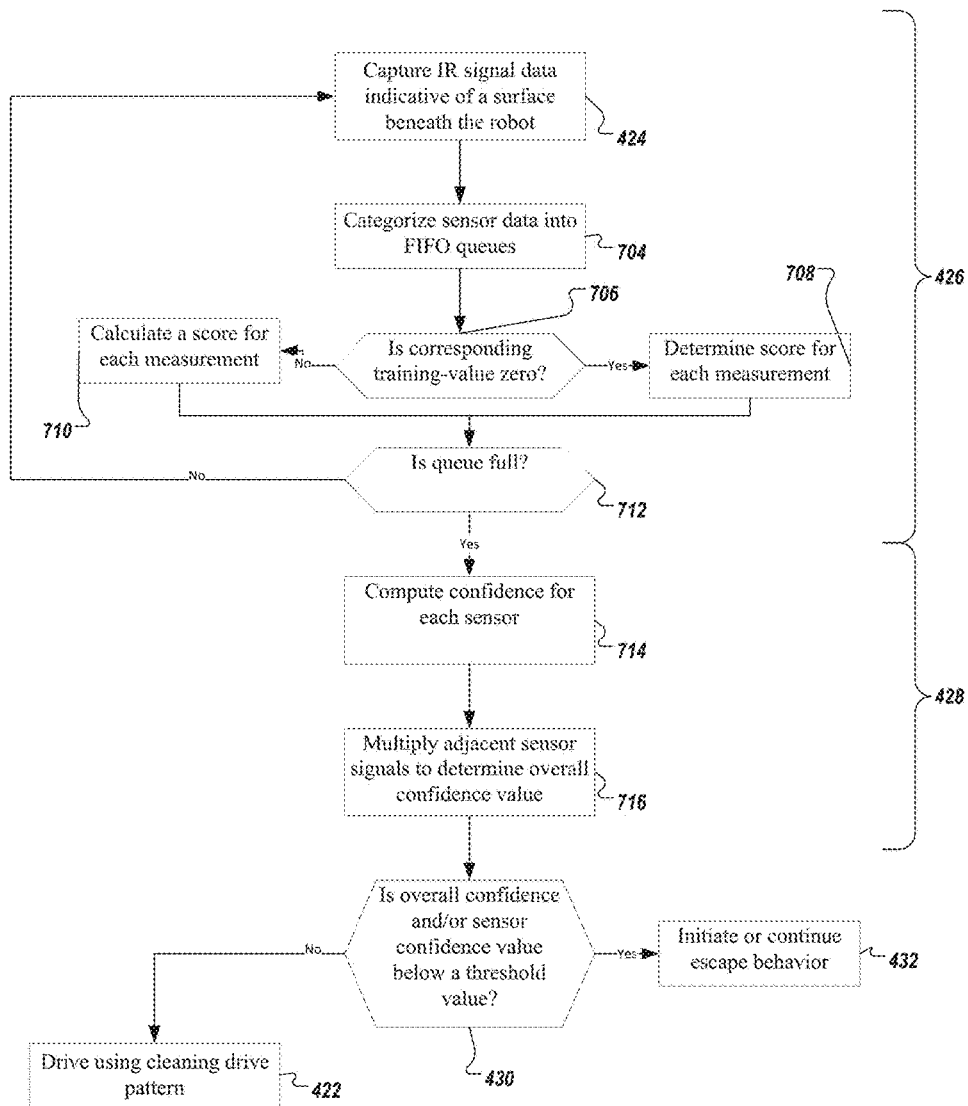
FIG. 7 is an exemplary arrangement of operations for a detection distribution determination process.

Referring again to FIG. 4, after calculating the baseline distribution (418), the robot 100 begins to clean the area. For example, the robot 100 proceeds to clean the surface using the Area Coverage Mode behavior as described above. While cleaning, the sensor system 308 continues to collect data from the surface sensors (424), and the classifier subsystem 370 calculates the distribution of the data recorded during detection (426). Also Referring to FIG. 7, in some cases the classifier subsystem identifies any sensor data captured by the surface sensors during a detection interval (702). This captured detection data is separated into individual arrays corresponding to originating surface sensors. The collected data may be separated into individual first-in-first out (FIFO) queues (704) so that data is analyzed in the order it is captured. The collected data may be compared against the training data to determine if there is a corresponding training-value (706). In this case, if the training-value is zero (i.e. no training data in that bin), the score for that sensor measurement can be set to a scaling value, e.g., a score-scale factor (708). If there is a corresponding training-value, the score for that sensor measurement can be calculated (710). This score can be calculated based on one or more factors or scaling factors such as noise-scaling factors to smooth the data and/or a score-scaling factor to distinguish values that correspond to the training data set from values that do not. In some examples, the score for each measurement can be calculated using Equation 1, $$\text{score} = \frac{score_{scale\ factor} * noise_{scale\ factor}}{Value_{training} + noise_{scale\ factor}} \quad \text{Equation 7}$$

where $score_{scale\ factor}$ is a scaling value; $noise_{scale\ factor}$ is a scaling value for data smoothing; and $Value_{training}$ is the corresponding training value, e.g., the number of training-values in the same category or bin. In this example, $score_{scale\ factor}$ can be a high value such that a high score indicates that the measurement does not match a training interval measurement.

Once the queues are full (712), the controller categorizes the collected data into categories, e.g., bins, as described above (708). The capacity of the queues may vary depending on available memory and/or senor update rate. In an example, the queue can have a capacity of 8 data readings per surface sensor with data being captured at a rate of 64 Hz. In this example, if the robot is traveling at 300 mm/sec, a queue would fill after approximately 0.125 seconds and after traveling approximately 3.75 cm. However, the number of data readings for the queues can vary. For example, the number of data readings can increase, e.g., to the limits of available storage and/or the update rate of the surface sensors, to improve reliability or performance.

Referring again to FIG. 4 and FIG. 7, the classifier subsystem compares the detected distribution with the baseline distribution (428) by calculating a confidence interval to determine a probability that the detection data corresponds to the training data. For example, the classifier subsystem may compare the frequency of each bin from the detection distribution with the baseline distribution from the training interval and may calculate a confidence interval for the data associated with each of the surface sensors. The confidence interval is based, at least in part, on a number of values that differ between the baseline distribution and the detection distribution. For example, for each sensor, a confidence value can be computed using the scores for each of its associated measurement values (714). In some examples, a confidence value for each surface sensor can be computed using Equation 8, $$confidence_{sensor} = \frac{(score_{scale\ factor} * queue_{length}) - score}{queue_{length}} \quad \text{Equation 8}$$

where $confidence_{sensor}$ is the confidence value for the surface sensor and $queue_{length}$ is the number of measurements in the queue. In some cases, the classifier subsystem multiplies adjacent sensor signals to determine an overall confidence value (716). In other cases, to determine an overall confidence value, the classifier subsystem combines the left two confidence values, middle two confidence values, and right two confidence values. The controller then compares the left, middle, and right confidence values against a predetermined confidence threshold values. The classifier subsystem can then compare the overall confidence values and/or each sensor value against a threshold value (430). If the confidence value is above the predetermined threshold, then it is likely that the detected surface is the same type of surface, and the robot 100 continues cleaning using the Area Coverage Mode to execute a cleaning drive pattern. If the confidence value is below the threshold, then it is likely that the detected surface is different from the selected surface. In examples where the adjacent sensor signal values are multiplied, this comparison is equivalent to a confidence of approximately 12.5% for each sensor, or 1.5% that the robot 100 remains on the same floor surface for the combined adjacent sensors. In some cases, the confidence threshold and the $score_{scale\ factor}$ may be the same value, however, this confidence threshold and/or the $score_{scale\ factor}$ can be adjusted depending on the noisiness and distribution of the data.

While the sensor signal values are generally described as representing a signal strength, other metrics can be measured and compared for the surface sensors and/or other sensors, e.g., an optical mouse sensor, to determine a change in floor surface. For example, different data representations can be used to form a histogram based data indicative of one or more characteristics of the floor surface, e.g., on the texture of captured image patches, such as in the intensity or frequency domain of the reflected light.

Detecting a different surface indicates that flooring change occurs in proximity to the robot. To avoid traveling beyond a selected area, the controller 302 initiates (432) the Escape Behavior Mode, e.g., by changing direction and traveling away from the flooring change for a set period of time (434). After this set time has elapsed (434), the robot may resume cleaning (422) using the Area Coverage Mode.

In some examples, a baseline distribution includes sensor data from each of the surface sensors combined into one baseline distribution, rather than a baseline distribution for each surface sensor. Similarly, in some examples the detection data is analyzed from a single array that includes the sensor data from each of the surface sensors. In these examples, the baseline distribution may include training data from all of the surface sensors may be compared with the detection data from all of the sensors at once. Data from a subset or various combinations of surface sensors may also be grouped in this manner. In some cases, the confidence interval may be improved by combining the data from one or more surface sensors. For example, such a combination may reduce the impact of data collection inconsistencies caused by unpredictable and/or erratic challenges, e.g., debris, sensor obstruction, or other obstacles.

In some examples, the controller may interrupt and end the Area Cleaning Routine 400 if the controller determines that the cleaning cycle is complete. In the Area Coverage Mode, the controller may determine, e.g., based on an area-sizer function, that the cleaning cycle is complete based on a variety of factors including considerations regarding the average distance travelled in the area or the total time spent within the designated area. As such, the controller will terminate the cleaning routine at the appropriate time for the designated area. Upon completion of the Area Cleaning Routine, the controller may continue to operate the robot in a cleaning mode but allow the robot to move beyond a flooring edge to clean adjacent flooring surfaces. For example, the controller can direct the robot to an adjoining area having a different floor surface and begin the Area Cleaning routine 400 within the new area. In this manner, the robot 100 may clean a series of areas in a systematic fashion before proceeding to the next area. After all areas have been cleaned, the controller can terminate the cleaning cycle. In some cases, the robot can determine the total size of all areas based on a variety of factors, including considerations regarding room size, total run time, total distance traveled, dirt sensing, etc. Alternatively, the robot may employ room-mapping programs. After the controller determines that all areas have been cleaned, the controller can alter the robot's direction to maneuver the robot back to a base station or another location.

Figure 5D:
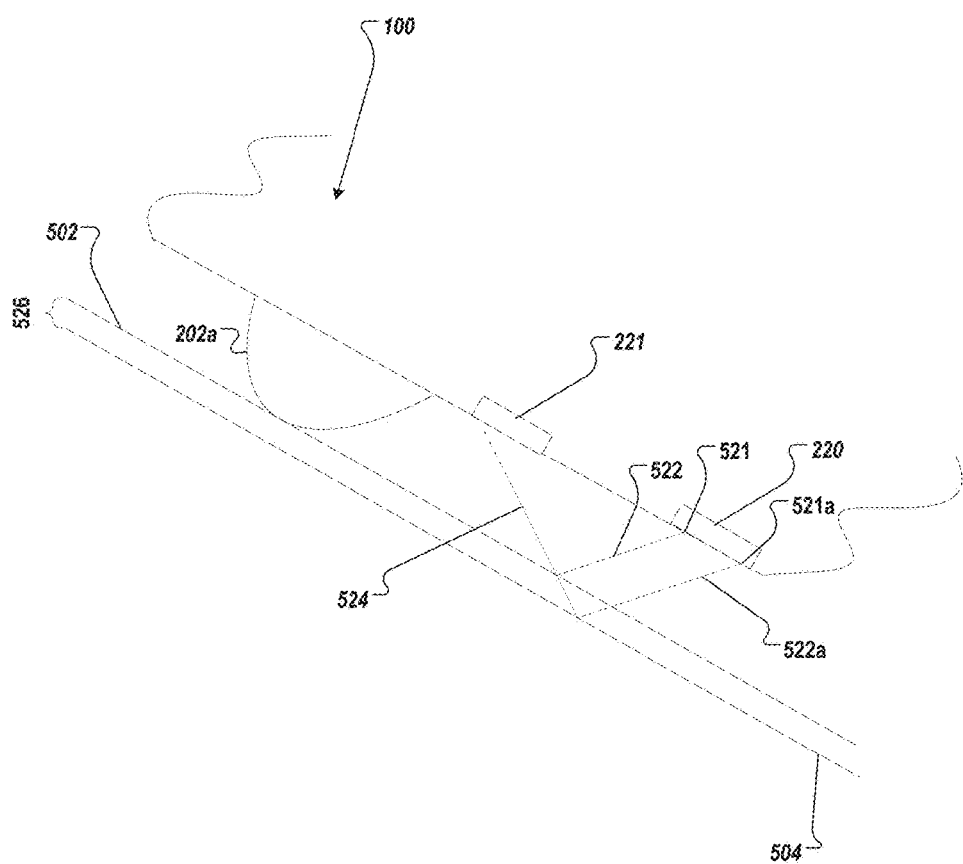
FIG. 5D is schematic side view of a robot at an elevated boundary between two different floor surfaces.

Referring back to FIGS. 5A-5D, during the Area Cleaning Routine 400 the robot 100 may encounter a boundary 508 of the selected area 501. As shown in FIG. 5B, the robot 100 reaches the boundary 508 of the selected area 501 and stops in a position 520 in which one of the surface sensors 220 extends over the boundary 508 while the wheel 202a remains within the selected area 501 (see FIG. 5B). At this location, the surface sensor 220 detects reflected IR signals 522 and determines, based on the process discussed above, that the hardwood floor surface 504 is different from the carpeted surface 502 of the selected area 501, either in type or elevation of the reflecting surface. In response, controller 302 controls robot motion to avoid the hardwood floor surface 504 and remain on selected area 501. An IR beam can also be emitted at an angle relative to the surface. For example, as shown in FIG. 5D, the robot 100 reaches a boundary of the selected area and stops in a position in which one of the surface sensors 220 extends partly over the boundary while the wheel 202a remains within the selected area. At this location, there is an elevation difference 526 between the carpeted surface 502 of the selected area and the hardwood floor surface 504. In this example, an IR emitter 221 emits an IR beam 524 towards the floor surface below the robot at an angle, e.g., a non-perpendicular angle, relative to the floor surface. An amount of reflected IR light 522 reflects from the carpeted surface 502 and is detected by the surface sensor 220 at a first location 521. Because of the elevation difference 526 between the carpeted surface 502 and the hardwood surface 504, the amount of IR light 522a reflected from the hardwood 504 is detected by the surface sensor 220 at a second location 521a. In response to detecting an altered signal-detection location by the sensor 220, the classifier subsystem sends a signal to the controller that represents a change in floor surface resulting in the controller maneuvering the robot to avoid the hardwood floor surface 504. In some examples, no amount of reflected IR light reaches the surface sensor 220. In this case, the classifier subsystem sends a signal to the controller that represents the presence of a "cliff" or substantial drop in flooring elevation.

Figure 8:
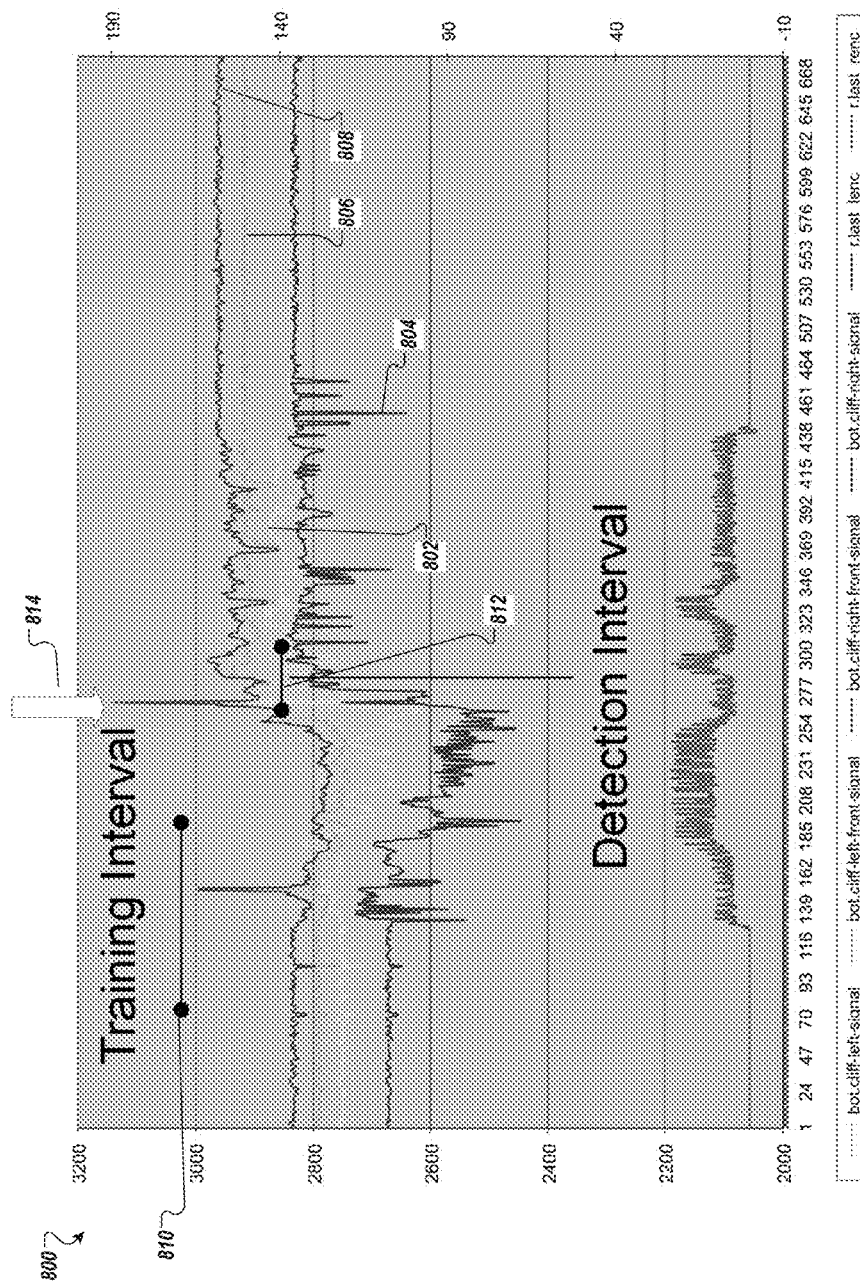
FIG. 8 is a graph showing collected data from sensors during robot movement.
Figure 9:
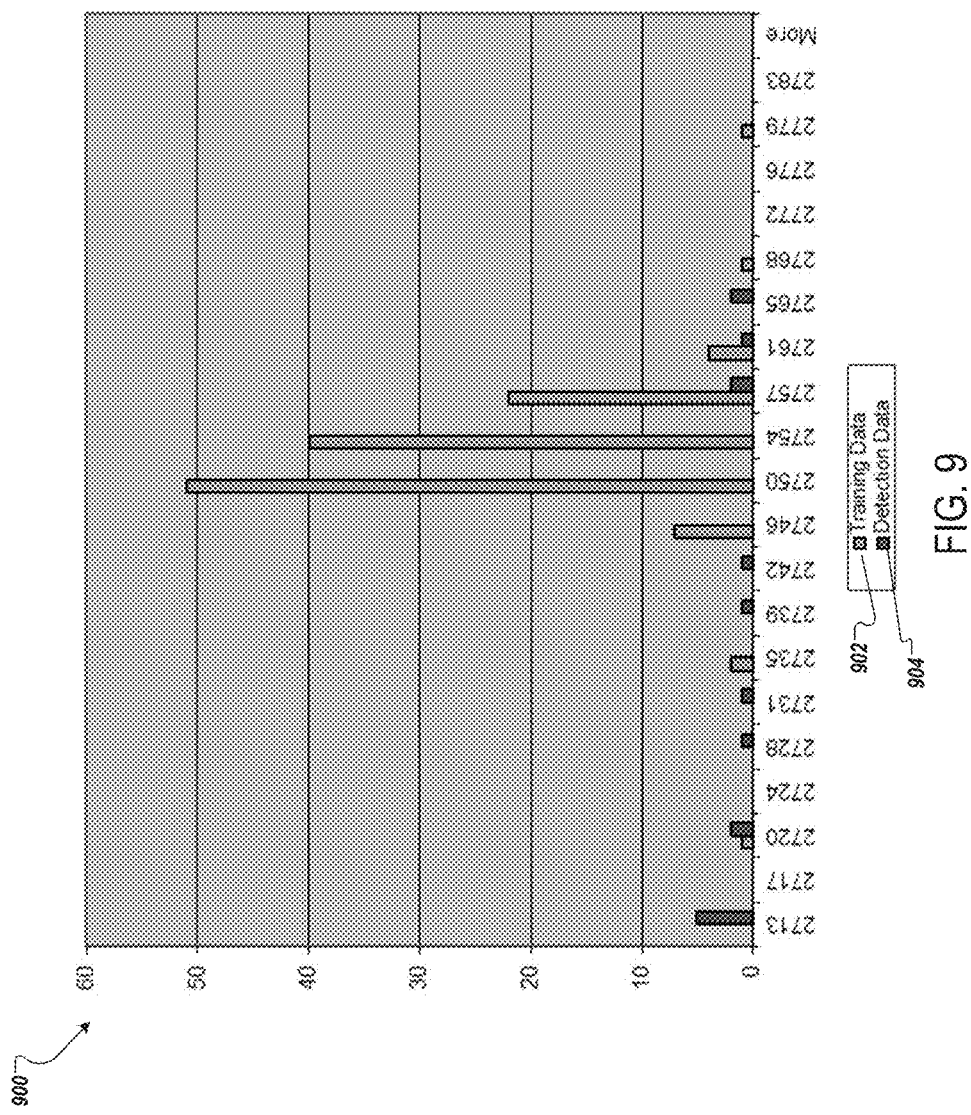
FIG. 9 is a graph illustrating a histogram of the data from FIG. 8.

As shown in FIG. 8, in some cases a change in floor surface material is visible based on a graph of acquired signal data. For example, signal data acquired by various surface sensors over time is shown in graph 800. Data captured by a surface sensor on the left-front of the robot corresponds to a trace 806, data captured by a surface sensor located on the left side of the robot corresponds to a trace 802, data captured by a surface sensor on the front right side of the robot corresponds to a trace 808, and data corresponding to a surface sensor on the right side of the robot 100 corresponds to a trace 804. The amplitude or amplitude variations for each of these peaks represents a signal strength value of detected IR radiation received at the respective sensor. Training data is acquired while the robot executes a training mode is shown for a training interval 810. Detection data acquired while the robot executes the Area Coverage Mode is shown for a detection interval 812. As in the above description of FIGS. 5A-5D, the robot in this example approached a boundary between a selected area and another flooring material, which caused an amplitude spike 814 in all traces. Referring also to FIG. 9, to detect flooring changes a histogram 900, a baseline distribution 902 was calculated for training data from the training interval 810 as well as a detection distribution 904 from the detection interval 812.

As described above, the controller may be advantageously configured to interpret a loss of reflected IR radiation at any one of the surface sensors, or a drop in radiation level to below a predetermined threshold, as the presence of a "cliff" or substantial drop in flooring elevation, such as would be desired to be avoided under all conditions. Thus, the flooring surface edge detection and area cleaning functions described above and a cliff edge avoidance function can be implemented with one set of surface sensors.

While a change in floor surface is generally described related to the surface sensor data, a change in floor surface can also be determined using similar comparisons of other sensed parameters, for example, motor current. In this example, a change in flooring may yield a variation in motor current data. This motor current data may be analyzed and compared as described with the data captured by the surface sensors.

A number of embodiments of the invention have been described. Nevertheless, it will be understood that various modifications may be made without departing from the spirit and scope of the invention. Accordingly, other embodiments are within the scope of the following claims.

What is claimed is:
1. A cleaning robot comprising:
a drive system configured to drive the cleaning robot;
a sensor configured to produce a sensor output indicative of a characteristic of a surface on which the cleaning robot is traveling; and
a controller in communication with the drive system and the sensor, the controller configured to control the drive system to drive the cleaning robot within a first area having a first surface type, and alter a drive direction of the cleaning robot in response to a determination indicating an edge of the first area having the first surface type has been reached, in which the edge represents a traversable border between the first area and a second area having a second surface type that is different from the first surface type, the determination being based on a change in a surface characteristic determined from a change in the sensor output, the drive direction altered so as to keep at least a portion of the cleaning robot from crossing the edge of the first area,
wherein the edge of the first area is an edge of at least one of a rug, a carpet, a hardwood surface, or a tile surface on which the cleaning robot is moving, and the sensor output is produced in response to sensing a signal reflected from another surface adjacent the edge of the at least one of the rug, the carpet, the hardwood surface, or the tile surface.

2. The cleaning robot of claim 1, wherein the controller is configured to alter a drive direction of the cleaning robot in response to a determination indicating an edge of the rug surface has been reached, and the sensor output is produced in response to sensing a signal reflected from another surface adjacent the edge of the rug.

3. The cleaning robot of claim 1, wherein the controller is configured to alter a drive direction of the cleaning robot in response to a determination indicating an edge of the carpet surface has been reached, and the sensor output is produced in response to sending a signal reflected from another surface adjacent the edge of the carpet.

4. The cleaning robot of claim 1, in which the sensor is configured to produce the sensor output in response to sensing a reflection of a signal from a surface, and the cleaning robot further comprises multiple sensors disposed at different locations about a peripheral edge of the cleaning robot, and wherein the controller is configured to alter the drive direction as a function of which sensor out of the multiple sensors senses the reflection of the signal from which the determination is made indicating the edge of the first area has been reached.

5. The cleaning robot of claim 1, wherein the sensor output indicates, at least in part, an elevation of floor surface.

6. The cleaning robot of claim 1, wherein the sensor output indicates, at least in part, a reflectivity of floor surface.

7. The cleaning robot of claim 1, wherein the sensor is configured to produce the sensor output in response to sensing a reflection of a signal from a surface, and the cleaning robot comprises a signal generator configured to generate the signal that is reflected from the surface.

8. The cleaning robot of claim 7, wherein the signal generator is configured to emit an infrared signal and wherein the sensor output indicates a reflection of the infrared signal from the surface.

9. The cleaning robot of claim 1, wherein the controller is further configured to control the drive system to drive the cleaning robot across the edge of the first area in response to completion of a predetermined cleaning period.

10. The cleaning robot of claim 1, wherein the controller is further configured to redirect the cleaning robot away from a cliff edge sensed by an absence of a reflected signal at the sensor.

11. The cleaning robot of claim 1 in which the first area comprises a carpeted area and the second area comprises an uncarpeted area.

12. The cleaning robot of claim 1 in which the controller is configured to control the drive system to drive the cleaning robot to follow the edge of the first area while keeping at least a portion of the cleaning robot from crossing the edge of the first area.

13. A method of maneuvering an autonomous robot across a surface within a bounded area having at least one open edge, the method comprising:

driving the autonomous robot across a surface while sensing a sensor output from a sensor of the autonomous robot, the sensor output indicative of a characteristic of the surface on which the autonomous robot is traveling;

while continuing to drive the autonomous robot, evaluating the sensor output against a baseline signal characteristic to determine whether the sensor output is indicative of the autonomous robot being adjacent the at least one open edge of the bounded area, in which the open edge represents a traversable border between the bounded area having a first surface type and a second area having a second surface type that is different from the first surface type; and, in response to determining from the sensor output that the autonomous robot is adjacent the at least one open edge of the bounded area, altering a direction of motion of the autonomous robot such that the autonomous robot is directed away from the at least one open edge, wherein the open edge is an edge of at least one of a rug, a carpet, a hardwood surface, or a tile surface on which the cleaning robot is moving, and the sensor output is produced in response to sensing a signal reflected from another surface adjacent the edge of the at least one of the rug, the carpet, the hardwood surface, or the tile surface.

14. The method of claim 13, wherein the bounded area is the area of the rug having a perimeter edge adjacent a surrounding floor surface, and the method comprises driving the autonomous robot across the rug and altering the direction of motion of the autonomous robot in response to the sensor output indicating reflection of a signal from a surface other than a surface of the rug.

15. The method of claim 13, wherein the bounded area is the carpeted area, wherein the at least one open edge is adjacent an uncarpeted floor surface, and the method comprises driving the autonomous robot across the carpet and altering the direction of motion of the autonomous robot in response to the sensor output indicating reflection of a signal from the uncarpeted floor surface.

16. The method of claim 13, wherein the sensor is one of multiple sensors disposed at different places about a periphery of the autonomous robot, and wherein sensor output is evaluated separately for each sensor of the multiple sensors.

17. The method of claim 16, wherein the direction of motion of the autonomous robot is altered as a function of what portion of the sensor output differs greatest from the baseline signal characteristic.

18. The method of claim 16, wherein the direction of motion of the autonomous robot is altered to navigate a corner of the bounded area in response to the sensor output indicating differences between respective signals received at sensors located on opposite sides of the autonomous robot.

19. The method of claim 13, wherein the autonomous robot further comprises a signal emitter configured to emit an infrared signal, and wherein the sensor output indicates a reflection of the infrared signal from a floor.

20. The method of claim 13, further comprising, in response to a reflected signal for the sensor diminishing below a predetermined threshold, moving the autonomous robot in a direction away from a current location of the sensor.

21. The method of claim 13, further comprising, upon determining from the sensor output that the autonomous robot is adjacent the at least one open edge of the bounded area following a triggering event, driving the autonomous robot across the at least one open edge.

22. The method of claim 13 in which altering a direction of motion of the autonomous robot comprises driving the autonomous robot to follow the edge of the bounded area while keeping at least a portion of the cleaning robot from crossing the edge of the bounded area.

* * * * *

Disclaimer

10,296,007 B2 - Jasper Vicenti, Boston, MA (US). MOBILE ROBOT AREA CLEANING. Patent dated May 21, 2019. Disclaimer filed January 19, 2021, by the assignee, iRobot Corporation.

I hereby disclaim the following complete claim 22 of said patent.

*(Official Gazette, July 26, 2022)*